(12) United States Patent
Boebst et al.

(10) Patent No.: US 10,368,566 B2
(45) Date of Patent: Aug. 6, 2019

(54) DEVICE FOR CONTROLLING THE TEMPERATURE OF PRODUCTS TO BE FROZEN

(71) Applicant: ARZNEIMITTEL GMBH APOTHEKER VETTER & CO. RAVENSBURG, Ravensburg (DE)

(72) Inventors: Benjamin Boebst, Mittelbiberach (DE); Frank Boettger, Ravensburg (DE)

(73) Assignee: ARZNEIMITTEL GMBH APOTHEKER VETTER & CO. RAVENSBURG, Ravensburg (DE)

( * ) Notice: Subject to any disclaimer, the term of this patent is extended or adjusted under 35 U.S.C. 154(b) by 707 days.

(21) Appl. No.: 15/154,201

(22) Filed: May 13, 2016

(65) Prior Publication Data
US 2016/0249671 A1    Sep. 1, 2016

Related U.S. Application Data

(62) Division of application No. 12/675,062, filed as application No. PCT/EP2008/006591 on Aug. 9, 2008, now Pat. No. 9,642,386.

(30) Foreign Application Priority Data

Aug. 28, 2007    (DE) ................. 10200740489

(51) Int. Cl.
| F26B 5/06 | (2006.01) |
| A23L 3/36 | (2006.01) |
| A23L 3/44 | (2006.01) |
| F25B 21/02 | (2006.01) |

(52) U.S. Cl.
CPC ............... *A23L 3/363* (2013.01); *A23L 3/44* (2013.01); *F25B 21/02* (2013.01); *F26B 5/06* (2013.01); *A23V 2002/00* (2013.01)

(58) Field of Classification Search
CPC .... F26B 5/06; A23L 3/363; A23L 3/44; F25B 21/02; A23V 2002/00
See application file for complete search history.

(56) References Cited

U.S. PATENT DOCUMENTS

| 3,247,602 | A | 4/1966 | Hamilton et al. |
| 3,261,110 | A | 7/1966 | Fuentevilla |
| 5,779,981 | A | 7/1998 | Danssaert et al. |
| 6,341,490 | B1 | 1/2002 | Jones |
| 9,642,386 | B2 * | 5/2017 | Boebst ............ F26B 5/06 |
| 2006/0053652 | A1 | 3/2006 | Gyory et al. |
| 2007/0060875 | A1 | 3/2007 | Bassarab et al. |
| 2007/0060876 | A1 | 3/2007 | Bassarab et al. |
| 2007/0060877 | A1 | 3/2007 | Bassarab et al. |

(Continued)

FOREIGN PATENT DOCUMENTS

| DE | 1604853 B1 | 7/1970 |
| DE | 1928973 A1 | 12/1970 |
| DE | 260120 A1 | 9/1988 |

(Continued)

*Primary Examiner* — Jessica Yuen
(74) *Attorney, Agent, or Firm* — Stephen T. Olson; Harness, Dickey & Pierce, P.L.C.

(57) ABSTRACT

The invention proposes a device (1) for controlling the temperature of products to be frozen during a freeze drying process. This device (1) is characterized in that at least one Peltier element (3) is present.

20 Claims, 1 Drawing Sheet

(56) References Cited

U.S. PATENT DOCUMENTS

2007/0129673 A1 6/2007 Bassarab et al.
2009/0182301 A1 7/2009 Bassarab et al.

FOREIGN PATENT DOCUMENTS

| DE | 60207688 T2 | 9/2006 |
|---|---|---|
| DE | 102006019641 A1 | 11/2006 |
| EP | 1366327 A1 | 12/2003 |
| EP | 1464401 A1 | 10/2004 |
| GB | 1017116 A | 1/1966 |
| GB | 1062031 A | 3/1967 |
| GB | 1173720 A | 12/1969 |
| WO | 89/12502 A1 | 12/1989 |
| WO | 2007/020237 A1 | 2/2007 |
| WO | 2007/020238 A2 | 2/2007 |
| WO | 2007/020239 A1 | 2/2007 |
| WO | 2007/020240 A1 | 2/2007 |

\* cited by examiner

DEVICE FOR CONTROLLING THE TEMPERATURE OF PRODUCTS TO BE FROZEN

CROSS-REFERENCE TO RELATED APPLICATIONS

This application is a divisional of U.S. patent application Ser. No. 12/675,062, filed Feb. 24, 2010, which is a 371 U.S. National Stage of International Application No. PCT/EP2008/006591 filed Aug. 9, 2008, and claims the benefit and priority of German Patent Application No, 10 2007 040 489.3, filed Aug. 28, 2007. The entire disclosure of each of the above applications is incorporated herein by reference.

FIELD

The invention relates to a device for controlling the temperature of products to be frozen in accordance with the pre-characterizing portion of claim 1.

BACKGROUND

Devices of the type discussed here are known. They are used for controlling the temperature of products to be frozen in freeze driers. In known freeze driers, a magazine is disposed on a storage space in the freeze drier during the freeze drying process. The magazine preferably comprises a plurality of receptacle areas for accommodating products to be frozen, in particular pharmaceutical solutions, that are disposed in pharmaceutical containers. The storage space comprises channels in which a temperature-controllable medium such as, for example, silicon oil, circulates. The temperature of the magazine is controlled via the storage space. During the freeze drying process, the product to be frozen is initially deep frozen. A primary drying follows, with the ice of the frozen product, for example, a pharmaceutical solvent, being sublimated. In a subsequent secondary drying, the water portion in the frozen product is further reduced, such that a solid substance remains, known as a lyophilisate. Pharmaceutical solutions in particular may be conserved gently and over long periods of time and, if necessary, may simply be dissolved again in a solvent, for example, water. The various phases that the product to be frozen undergoes during the freeze drying process are controlled, on the one hand, by the temperature of the product to be frozen and, on the other hand, by the pressure in the freeze drier. As already mentioned above, the temperature of the product to be frozen is controlled here by the temperature-controllable medium provided in the storage space. Due to their different compositions, various pharmaceutical solutions require different temperature and pressure progressions during the freeze drying process in order to be convertible to high-quality lyophilisate. In known freeze dryers, a large number of trial runs is necessary to find the optimal temperature and pressure progression for a newly developed pharmaceutical solution. For this reason, the test phase for the freeze drying process takes a very long time.

SUMMARY

The object of the invention is therefore to create a device for controlling the temperature of products to be frozen that considerably shortens the test phase of products to be freeze dried.

In order to attain this object, the invention proposes a device for controlling the temperature of products to be frozen having the features of claim 1. This device is characterized by at least one Peltier element. This advantageously allows the temperature control of products to be frozen during the freeze drying process to be structured in an extremely flexible fashion, resulting in a considerable shortening of the test phase, in particular of a newly developed pharmaceutical solution.

A device is particularly preferred that is characterized in that the at, least one Peltier element is disposed between at least one magazine comprising receptacles for accommodating products to be frozen and a placement surface. This design allows for a particularly simple design and a particularly cost-effective implementation of a device for controlling the temperature of products to be frozen.

A device is also preferred that is characterized in that at least two Peltier elements are provided. By the use of at least two Peltier elements, it is advantageously possible to provide different temperatures in different areas of the freeze drier during a freeze drying process, i.e., to selectively control the temperature of at least one magazine. Thus, it is possible to test at least two temperature progressions for a product to be frozen or even for multiple products to be frozen during a single freeze drying process.

A device is also preferred that is characterized in that a Peltier element is associated with at least one receptacle area of a magazine. It is therefore quite conceivable for the temperature of individual receptacle areas, for example, an individual product to be frozen, to be selectively controlled by means of a Peltier element.

In another preferred device, provision is made for a Peltier element to be associated with a plurality of receptacle areas of a magazine. For example, it is conceivable for various pharmaceutical solutions to be subjected to the freeze drying process with the same temperature progression.

A device is also preferred that is characterized in that a Peltier element is associated with precisely one magazine. In particular, provision is made for the Peltier element to have the same dimensions as the magazine.

Moreover, a device is preferred that is characterized in that a Peltier element is associated with a plurality of magazines. In order to better differentiate between different products to be frozen, for example, one magazine may contain a certain product to be frozen, and another magazine may, in contrast, contain a different product to be frozen.

Finally, a device is preferred that is characterized in that a plurality of Peltier elements are associated with one magazine. In particular, a conventional magazine may be provided, with a plurality of Peltier elements being disposed on the storage space upon which the magazine is placed. Via the plurality of Peltier elements, which may be cooled or heated to different extents, it is thus possible for different regions of a single magazine to be subjected to different temperatures.

DRAWINGS

FIG. 1 shows a perspective view of a device 1 for controlling the temperature of products to be frozen during a freeze drying process.

FIG. 2 is a perspective view similar to FIG. 1 illustrating a partial region of another device for controlling the temperature of products to be frozen.

DETAILED DESCRIPTION

The device 1 comprises a Peltier element 3 that is disposed between a magazine 5 and a storage space 7. The storage space 7 is part of a freeze drier, which is not shown. In contrast, the magazine 5 is stored outside of the freeze drier and is located inside the freeze drier only during a freeze drying process. The functionality of Peltier elements is sufficiently known from prior art, such that it need not be discussed in greater detail here.

Figure 1:
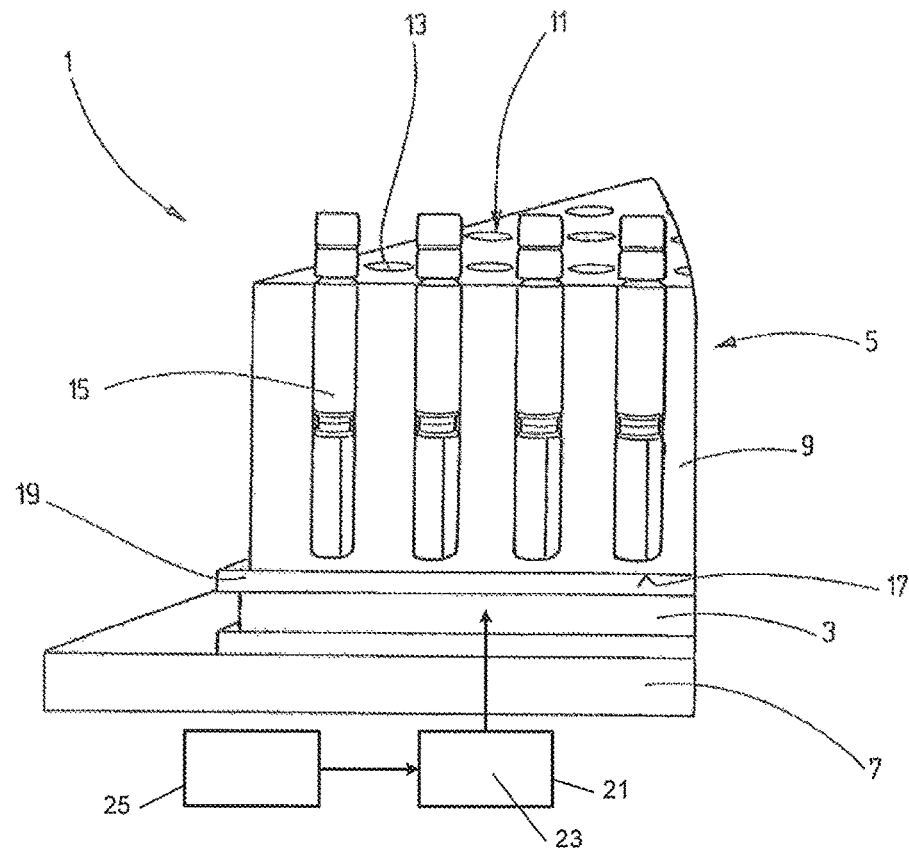
FIG. 1 is a perspective view of a partial region of a device for controlling the temperature of products to be frozen.

The magazine 5 comprises a base body 9 and at least one, in this case a plurality of, receptacle areas 11 that are implemented as receptacle openings 13 in the base body 9. The product to be frozen 15 is disposed in the receptacle areas 11 of the magazine 5. In FIG. 1, provision is made for the product to be frozen 15, in particular a pharmaceutical solution, to be placed in a dual-chamber syringe, for example.

The magazine 5 is shown here purely by way of example and may have any desired design. It is only critical that a placement surface 17 of the magazine 5 rest on a metal plate 19 of the Peltier element 3, such that the heat or cold generated by the Peltier element 3 is conducted by the metal plate 19 via the placement surface 17 and the base body 9 of the magazine 5 to the product to be frozen 15.

The Peltier element 3 is preferably connected to an actuating unit 21 that determines the current through the Peltier element 3 and thus the temperature of the metal plate 19.

Figure 2:
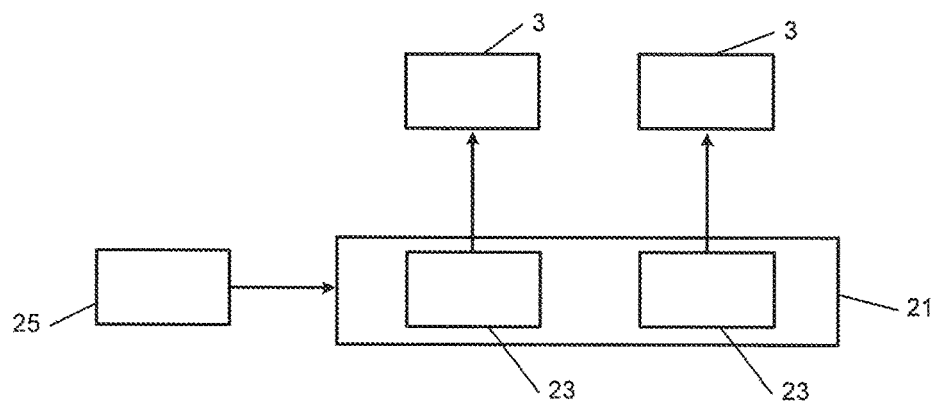
FIG. 2 is a functional block diagram of a portion of a device for controlling the temperature of products to be frozen.

At least one Peltier element 3 is preferably disposed between the magazine 5 and the storage space 7. In particular, a plurality of Peltier elements 3 are disposed on the storage space 7, each of which may be actuated by separate actuating elements 23, as shown in FIG. 2, and thus are able to have different temperatures. Either one magazine 5 preferably covering the Peltier elements 3 completely or a plurality of smaller magazines 5 may be provided on a plurality of Peltier elements 3. In particular, provision is made for precisely one Peltier element 3 to be associated with one magazine 5. Here, the magazine 5 preferably has the same dimensions as the Peltier element 3.

As is shown in FIG. 1, the magazine 5 preferably comprises a plurality of receptacle areas 11. A plurality of receptacle areas 11 of one or more magazines 5 may be associated with one Peltier element 3. However, provision may also be made for one Peltier element 3 to be associated with precisely one receptacle area 11.

One Peltier element 3 may also be associated with a plurality of magazines 5; this may be advantageous for differentiation when different products to be frozen are disposed in different magazines but are to be subjected to the same temperature.

As was already discussed above, a conventional magazine 5 and a conventional storage space 7 may be provided for the device 1 proposed here for controlling the temperature of products to be frozen 15. In order to realize the device 1 proposed here: it is merely necessary to provide one or more Peltier elements 3 on the storage space 7 and to dispose at least one magazine 5 on the at least one Peltier element 3. The device 1 for controlling the temperature of products to be frozen may therefore be realized in a particularly easy and cost-effective fashion.

The present invention allows for the temperature of individual regions of a freeze drier, in particular individual regions of a magazine 5 or a plurality of magazines 5, to be controlled selectively during one single freeze drying process, i.e., for the products to be frozen disposed in the magazines to be subjected to different temperatures. In this manner, the test phases for newly developed pharmaceutical solutions are significantly shortened because a plurality of temperature progressions may be tested during one single freeze drying process, thus requiring a significantly lower number of test runs until the optimal temperature progression has been found for a solution. It is also conceivable for different pharmaceutical solutions to be dried at different temperatures in the same freeze drying process.

The Peltier element 3 is preferably connected to the actuating unit 21, which is able to cooperate with a control unit 25, which measures the temperatures of the product to be frozen 15 and/or the magazine 5 and/or the storage space 7 via temperature sensors and transmits corresponding signals to the actuating unit 21. The actuating unit 21 is able to increase, decrease, or reverse the polarity of the current for the Peltier element 3 as a function of the measured temperature values. Thus, it is advantageously possible for a particularly flexible control loop to be created that moreover effects a stable freeze drying process because it is possible to react to fluctuations in the temperature of the product to be frozen 15 in a significantly faster manner.

As has already been stated above, the present invention allows different regions inside a freeze drier, which is not shown, to be subjected to different temperatures and thus to control the temperature of product to be frozen in a selective fashion, such that a freeze drying cycle becomes significantly more efficient.

It is critical that, in different regions of the freeze drier, different temperatures be able to prevail, i.e., for different receptacle areas of a magazine and thus the product to be frozen located therein to be able to be subjected to different temperatures. The device 1 for tempering products to be frozen may be realized in a particularly simple fashion by at least one Peltier element 3 disposed between a storage space 7 and at least one magazine 5. Moreover, the device allows for the test phase for the freeze drying process, in particular for newly developed pharmaceutical solutions, to be significantly shortened. Furthermore, the metal plate 19 of the Peltier element 3 requires a significantly shorter temperature change period, such that it is possible to react more quickly to temperature fluctuations in the products to be frozen 15.

What is claimed is:

1. A method for controlling a temperature of products to be frozen during a freeze drying process, the method comprising:
    providing a cooling device including at least one magazine having different areas for accommodating products to be frozen, a plurality of Peltier elements associated with the at least one magazine, and separate actuating elements that actuate the plurality of Peltier elements; and
    independently controlling the actuating elements such that the different areas of the at least one magazine are maintainable at different cold temperatures by the plurality of Peltier elements during a dry freezing process.

2. The method of claim 1 wherein;
    the cooling device further includes a metal plate;
    a placement surface of the at least one magazine rests on the metal plate; and
    the method further comprises conducting cold generated by the plurality of Peltier elements via the placement surface of the at least one magazine to the product to be frozen during the freeze drying process.

3. The method of claim 1 wherein:
the cooling device further includes a control unit that measures temperatures of at least one of the products to be frozen; and
the method further comprises controlling the actuating elements in response to the measured temperatures to adjust current supplied to the Peltier elements as a function of the measured temperatures.

4. The method of claim 3, further comprising adjusting a magnitude of the current supplied to the Peltier elements as a function of the measured temperatures.

5. The method of claim 3, further comprising adjusting a polarity of the current supplied to the Peltier elements as a function of the measured temperatures.

6. A method for controlling a temperature of a product to be frozen during a freeze drying process, the method comprising:
placing the product in a plurality of receptacles in a magazine, wherein the magazine is in a thermally conductive relationship with a plurality of Peltier elements; and
independently controlling current supplied to the plurality of Peltier elements to maintain different regions of the magazine at different temperatures while freeze drying the product.

7. The method of claim 6 further comprising independently controlling the current supplied to the plurality of Peltier elements to maintain the different regions of the magazine at different freezing temperatures while freeze drying the product.

8. The method of claim 6 further comprising:
measuring a temperature of at least one of the product to be frozen, the magazine, and a placement surface of the at least one magazine that rests on the plurality of Peltier elements; and
controlling the current supplied to the plurality of Peltier elements based on the measured temperature.

9. The method of claim 8 further comprising controlling both a magnitude of the current and a polarity of the current based on the measured temperature.

10. The method of claim 6 further comprising:
measuring a temperature of the product to be frozen;
measuring a temperature of the magazine;
measuring a temperature of a placement surface of the magazine that rests on the plurality of Peltier elements; and
controlling the current supplied to the plurality of Peltier elements based on the measured temperatures.

11. The method of claim 6 further comprising independently controlling the current supplied to the plurality of Peltier elements using a plurality of actuating elements.

12. The method of claim 6 wherein one of the plurality of Peltier elements is associated with a plurality of the receptacles.

13. The method of claim 6 wherein each of the plurality of Peltier elements is associated with only one of the plurality of the receptacles.

14. A method for controlling a temperature of a pharmaceutical solution to be frozen during a freeze drying process, the method comprising:
placing pharmaceutical containers containing the pharmaceutical solution in a plurality of receptacles in a magazine, wherein the magazine is in a thermally conductive relationship with a plurality of Peltier elements; and
independently controlling current supplied to the plurality of Peltier elements to maintain different regions of the magazine at different temperatures while freeze drying the pharmaceutical solutions.

15. The method of claim 14 further comprising independently controlling the current supplied to the plurality of Peltier elements to subject the different regions of the magazine to different temperature progressions while freeze drying the pharmaceutical solution.

16. The method of claim 14 further comprising independently controlling the current supplied to the plurality of Peltier elements to subject the different regions of the magazine to different temperature progressions during a single freeze drying process.

17. The method of claim 14 further comprising independently controlling the current supplied to the plurality of Peltier elements to maintain the different regions of the magazine at different freezing temperatures.

18. The method of claim 14 further comprising:
measuring a temperature of at least one of the pharmaceutical solution, the magazine, and a placement surface of the magazine that rests on the plurality of Peltier elements; and
controlling the current supplied to the plurality of Peltier elements based on the measured temperature.

19. The method of claim 14 further comprising controlling the current supplied to one of the plurality of Peltier elements to adjust a temperature of multiple ones of the receptacles.

20. The method of claim 14 further comprising controlling the current supplied to each of the plurality of Peltier elements to adjust a temperature of only one of the receptacles.

* * * * *